(12) United States Patent
Chen et al.

(10) Patent No.: US 11,901,511 B2
(45) Date of Patent: Feb. 13, 2024

(54) NONAQUEOUS ELECTROLYTE, LITHIUM-ION BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Peipei Chen, Ningde (CN); Chengdu Liang, Ningde (CN); Chenghua Fu, Ningde (CN); Junmin Feng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 487 days.

(21) Appl. No.: 17/189,084

(22) Filed: Mar. 1, 2021

(65) Prior Publication Data
US 2021/0202997 A1    Jul. 1, 2021

Related U.S. Application Data

(63) Continuation of application No. PCT/CN2019/108603, filed on Sep. 27, 2019.

(30) Foreign Application Priority Data

Sep. 28, 2018    (CN) .......................... 201811141756.2

(51) Int. Cl.
*H01M 10/0569*   (2010.01)
*H01M 10/0567*   (2010.01)
*H01M 10/0525*   (2010.01)

(52) U.S. Cl.
CPC ... *H01M 10/0569* (2013.01); *H01M 10/0525* (2013.01); *H01M 10/0567* (2013.01); *H01M 2220/20* (2013.01); *H01M 2300/0037* (2013.01)

(58) Field of Classification Search
None
See application file for complete search history.

(56) References Cited

U.S. PATENT DOCUMENTS

2017/0301952 A1    10/2017  Changlong

FOREIGN PATENT DOCUMENTS

| | | | |
|---|---|---|---|
| CN | 1428885 | A | 7/2003 |
| CN | 102403535 | A | 4/2012 |
| CN | 102593513 | A | 7/2012 |
| CN | 102790236 | A * | 11/2012 ........ H01M 10/0567 |
| CN | 102790236 | A | 11/2012 |
| CN | 103107355 | A | 5/2013 |
| CN | 104300172 | A | 1/2015 |
| CN | 105576283 | A | 5/2016 |
| CN | 105870505 | A | 8/2016 |
| CN | 106104895 | A | 11/2016 |
| CN | 107611479 | A | 1/2018 |
| CN | 107959050 | A | 4/2018 |
| EP | 2631980 | B1 | 10/2017 |
| JP | 2003132944 | A | 5/2003 |
| JP | 2013051342 | A | 3/2013 |
| JP | 2014049294 | A | 3/2014 |
| JP | 2015149250 | A | 8/2015 |
| WO | WO199/19932 | A1 | 4/1999 |
| WO | WO2015/179205 | A1 | 11/2015 |
| WO | WO2017/209762 | A1 | 6/2016 |

OTHER PUBLICATIONS

Contemporary Amperex Technology Co., Limited, International Search Report and Written Opinion, PCT/CN2019/108603, dated Dec. 27, 2019, 18 pgs.
Contemporary Amperex Technology Co., Limited, Extended European Search Report, EP19868012.6, dated Nov. 3, 2021, 11 pgs.
Ningder Age New Energy Technology Co. Ltd., First Office Action, CN201811141756.2, dated Aug. 31, 2020, 16 pgs.

(Continued)

*Primary Examiner* — Carlos Barcena
(74) *Attorney, Agent, or Firm* — Kilpatrick Townsend & Stockton LLP

(57) ABSTRACT

This application provides a nonaqueous electrolyte, a lithium-ion battery, a battery module, a battery pack, and an apparatus. The nonaqueous electrolyte includes a nonaqueous solvent, a lithium salt, and an additive, where the nonaqueous solvent includes a carbonate solvent and a high oxidation potential solvent, and the additive includes cyclic sulfate. The high oxidation potential solvent is selected from one or more of compounds represented by formula I and formula II, and the cyclic sulfate may be selected from one or more of compounds represented by formula III. This application can not only improve electrochemical performance of the lithium-ion battery under high temperature and high voltage and improve safety performance such as overcharge safety and hot box safety of the lithium-ion battery, but also ensure that the lithium-ion battery has some kinetic performance.

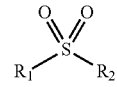

Formula I

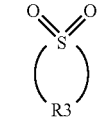

Formula II

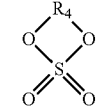

Formula III

14 Claims, 4 Drawing Sheets

(56) References Cited

OTHER PUBLICATIONS

Ningder Age New Energy Technology Co. Ltd., Second Office Action, CN201811141756.2, dated Nov. 13, 2020, 16 pgs.
Ningder Age New Energy Technology Co. Ltd., Third Office Action, CN201811141756.2, dated Jan. 22, 2021, 18 pgs.

* cited by examiner

NONAQUEOUS ELECTROLYTE, LITHIUM-ION BATTERY, BATTERY MODULE, BATTERY PACK, AND APPARATUS

CROSS-REFERENCE TO RELATED APPLICATIONS

This application is a continuation application of PCT Patent Application No. PCT/CN2019/108603, entitled "NONAQUEOUS ELECTROLYTE, LITHIUM-ION BATTERY, BATTERY MODULE, BATTERY PACK, AND APPARATUS" filed on Sep. 27, 2019, which claims priority to Chinese Patent Application No. 201811141756.2, filed on Sep. 28, 2018 and entitled "NONAQUEOUS ELECTROLYTE AND LITHIUM-ION BATTERY", both of which are incorporated herein by reference in their entirety.

TECHNICAL FIELD

This application relates to a nonaqueous electrolyte, a lithium-ion battery, a battery module, a battery pack, and an apparatus.

BACKGROUND

Lithium-ion batteries are widely applied to electromobiles and consumer electronic products due to their advantages such as high energy density, high output power, long cycle life, and low environmental pollution. Current requirements for lithium-ion batteries are high voltage, high power, long cycle life, long storage life, and superb safety performance.

At present, nonaqueous electrolyte systems that use lithium hexafluorophosphate as a conductive lithium salt and cyclic carbonate and/or linear carbonate as a solvent are widely applied in lithium-ion batteries. However, the above nonaqueous electrolytes still have many shortcomings. For example, in a high-voltage system, cycle performance, storage performance and safety performance of the above nonaqueous electrolytes need to be improved. For another example, in a lithium cobalt oxide or high nickel ternary system, safety performance such as overcharge safety and hot box safety of lithium-ion batteries needs to be improved.

SUMMARY

In view of the problems in the Background, this application is intended to provide a nonaqueous electrolyte, a lithium-ion battery, a battery module, a battery pack, and an apparatus. The nonaqueous electrolyte can not only improve electrochemical performance of a lithium-ion battery under high temperature and high voltage and improve safety performance such as overcharge safety and hot box safety of a lithium-ion battery, but also ensure that the lithium-ion battery has some kinetic performance.

In order to achieve the above objective, in a first aspect of this application, this application provides a nonaqueous electrolyte, including a nonaqueous solvent, a lithium salt, and an additive. The nonaqueous solvent includes a carbonate solvent and a high oxidation potential solvent, and the additive includes cyclic sulfate. The high oxidation potential solvent is selected from one or more of compounds represented by formula I and formula II, and the cyclic sulfate may be selected from one or more of compounds represented by formula III. In formula I, $R_1$ and $R_2$ are independently selected from unsubstituted, partially halogenated or fully halogenated alkyl groups having 1 to 5 carbon atoms, and at least one of $R_1$ and $R_2$ is a partially halogenated or fully halogenated alkyl group having 1 to 5 carbon atoms. In formula II, $R_3$ is selected from partially halogenated or fully halogenated alkylidene groups having 1 to 6 carbon atoms. In formula III, $R_4$ is selected from unsubstituted, partially halogenated, or fully halogenated alkylidene groups having 1 to 6 carbon atoms. A halogen atom is selected from one or more of F, Cl, Br, and I.

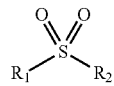

Formula I

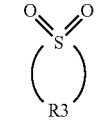

Formula II

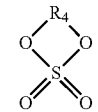

Formula III

According to a second aspect of this application, this application provides a lithium-ion battery, including a positive electrode plate, a negative electrode plate, a separator and the nonaqueous electrolyte according to the first aspect of this application.

According to a third aspect of this application provides a battery module, including the lithium-ion battery according to the second aspect of this application.

A fourth aspect of this application provides a battery pack, including the battery module in the third aspect of this application.

According to a fifth aspect of this application provides an apparatus, including the lithium-ion battery according to the second aspect of this application, where the lithium-ion battery is used as a power supply for the apparatus.

Compared with the prior art, this application includes at least the following beneficial effects:

(1) As the nonaqueous electrolyte in this application uses a mixed solvent formed by a high oxidation potential solvent and a carbonate solvent, the nonaqueous electrolyte can overcome disadvantages of conventional carbonate solvents, such as poor oxidation resistance, easy high-pressure decomposition and gas generation, low flash point, and easy combustion, and can greatly improve safety performance such as overcharge safety and hot box safety of a lithium-ion battery.

(2) The nonaqueous electrolyte in this application can combine advantages of high oxidation resistance and non-flammability of high oxidation potential solvents with advantages of low viscosity and high dielectric constant of carbonate solvents. As such, the nonaqueous electrolyte can not only improve electrochemical performance of a lithium-ion battery under high temperature and high voltage, but also ensure that the lithium-ion battery has some kinetic performance.

(3) The nonaqueous electrolyte of this application includes the additive, cyclic sulfate. The additive cyclic sulfate may first form a stable interface protective film on the negative electrode, thereby suppressing side reactions of the high oxidation potential solvent on the negative electrode. In addition, the additive cyclic sulfate may generate lithium sulfate that structurally contains an alkoxy structure (—$CH_2CH_2O$—) during the process of film forming on the negative electrode. This can effectively adjust viscoelasticity of the interface protective film on the negative electrode, improve kinetics of lithium ion transfer at the interface, and finally form a thin and dense interface protective film with good kinetics of lithium ion transfer on the negative electrode. This can effectively make up for the defects of large viscosity with the high oxidation potential solvent and poor compatibility with the negative electrode, and be conducive to obtain the lithium-ion battery with good kinetic and electrochemical performance.

(4) In addition, the cyclic sulfate may also form a stable interface protective film on a surface of the positive electrode to further improve oxidation resistance of the nonaqueous electrolyte. Therefore, this is beneficial to improve safety performance of overcharge safety, hot box safety, and the like of the lithium-ion battery to some extent.

The battery module, the battery pack, and the apparatus in this application include the lithium-ion battery, and therefore have at least the same advantages as the lithium-ion battery.

Figure 1:
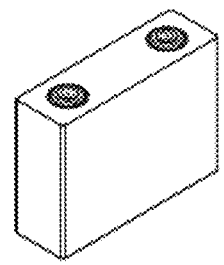
FIG. 1 is a perspective view of an embodiment of a lithium-ion battery.

Reference signs are described as follows:
1. battery pack;
2. upper box body;
3. lower box body;
4. battery module;
    5. lithium-ion battery;
        51. housing;
        52. electrode assembly;
            521. first electrode plate;
                521a. first current collector;
                521b. first active material layer;
            522. second electrode plate;
                522a. second current collector;
                522b. second active material layer;
            523. separator;
            524. first tab;
            525. second tab; and
        53. top cover assembly.

DESCRIPTION OF EMBODIMENTS

The following describes in detail a nonaqueous electrolyte, a lithium-ion battery, a battery module, a battery pack, and an apparatus according to this application.

The nonaqueous electrolyte according to the first aspect of this application is described first. The nonaqueous electrolyte includes a nonaqueous solvent, a lithium salt, and an additive. The nonaqueous solvent includes a carbonate solvent and a high oxidation potential solvent, and the additive includes cyclic sulfate.

The high oxidation potential solvent is selected from one or more of compounds represented by formula I and formula II. In formula I, $R_1$ and $R_2$ are independently selected from unsubstituted, partially halogenated or fully halogenated alkyl groups having 1 to 5 carbon atoms, and at least one of $R_1$ and $R_2$ is a partially halogenated or fully halogenated alkyl group having 1 to 5 carbon atoms. In formula II, $R_3$ is selected from partially halogenated or fully halogenated alkylidene groups having 1 to 6 carbon atoms.

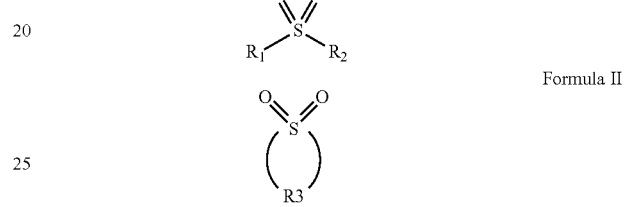

Formula I

Formula II

The cyclic sulfate is selected from one or more of compounds represented by formula III. In formula II, $R_4$ is selected from unsubstituted, partially halogenated, or fully halogenated alkylidene groups having 1 to 6 carbon atoms.

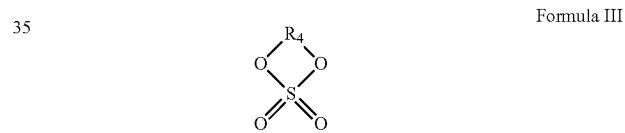

Formula III

In $R_1$, $R_2$, $R_3$, and $R_4$, alkyl and alkylene may be in a linear structure or a branched structure; when the alkyl and alkylene are partially or fully halogenated, a quantity of specific types of a halogen atom may be one or more; and the halogen atom is selected from one or more of F, Cl, Br, and I, and further, F.

Currently, the carbonate solvent is often used as an electrolyte in the lithium-ion battery. As this type of solvent has poor oxidation resistance, the solvent has slight oxidation at even about 4V under room temperature (25° C.). As the voltage and temperature increase, the solvent has more and more substantial oxidization and gas generation. In addition, as this type of solvent has a low flash point (generally below 35° C.), the solvent may easily burn when exposed to an open flame, and releases a large amount of heat. Therefore, lithium-ion batteries using conventional carbonate solvents have high potential hazards in safety performance.

In the nonaqueous electrolyte of this application, a mixed solvent formed by a high oxidation potential solvent and a carbonate solvent is used. As the high oxidation potential solvent has advantages of high oxidation resistance and non-flammability, and can overcome disadvantages of poor oxidation resistance, easy high-pressure decomposition and gas generation, a low flash point, easy combustion, and the like of conventional carbonate solvents, the nonaqueous electrolyte of this application may greatly improve safety performance such as overcharge safety and hot box safety of a lithium-ion battery, and can also improve electrochemical performance such as storage life and cycle life of a high-temperature and high-voltage battery system.

However, although the high oxidation potential solvent has the advantages of high oxidation resistance and non-flammability, the high oxidation potential solvent has poor compatibility with the negative electrode and may cause side reactions on the negative electrode. In addition, viscosity of the high oxidation potential solvent is higher than that of the carbonate solvent. After the high oxidation potential solvent is added, overall viscosity of the nonaqueous electrolyte increases greatly, and electrical conductivity decreases, so that electrochemical performance and kinetic performance such as a cycle life of the lithium-ion battery are negatively affected. The additive cyclic sulfate may first form a stable interface protective film on the negative electrode, thereby suppressing side reactions of the high oxidation potential solvent on the negative electrode. In addition, the additive cyclic sulfate may generate lithium sulfate that structurally contains an alkoxy structure (—$CH_2CH_2O$—) during the process of film forming on the negative electrode. This can effectively adjust viscoelasticity of the interface protective film on the negative electrode, improve kinetics of lithium ion transfer at the interface, and finally may form a thin and dense interface protective film with good kinetics of lithium ion transfer on the negative electrode. Therefore, the additive cyclic sulfate can effectively make up for the defects of the high oxidation potential solvent with the high viscosity and poor compatibility with the negative electrode, and be conducive to obtain the lithium-ion battery with good kinetic and electrochemical performance. In addition, the cyclic sulfate may also form a stable interface protective film on a surface of the positive electrode to further improve oxidation resistance of the nonaqueous electrolyte. As such, in addition to better improving kinetic performance and electrochemical performance such as a cycle life and a storage life of the lithium-ion battery, the addition of the cyclic sulfate (for example, DTD) may improve safety performance such as overcharge safety and hot box safety of the lithium-ion battery to some extent.

In the nonaqueous electrolyte of this application, when the weight percentage of the high oxidation potential solvent is lower, the effect in overcoming the disadvantages of carbonate solvents such as poor oxidation resistance, easy high-pressure decomposition and gas generation, a low flash point and easy combustion is not obvious; and when the weight percentage of the high oxidation potential solvent is higher, overall viscosity of the nonaqueous electrolyte increases greatly, and conductivity decreases, which has greater impact on kinetic performance of the lithium-ion battery. Therefore, in some embodiments, based on a total weight of the nonaqueous solvent, a weight percentage of the high oxidation potential solvent is 10% to 60%. In this case, the advantages of high oxidation resistance and non-flammability of the high oxidation potential solvent may be better combined with the advantages of low viscosity and dielectric constant of the carbonate solvent. Therefore, not only electrochemical performance of the lithium-ion battery under high temperature and high voltage may be improved, but also the lithium-ion battery may be ensured to have some kinetic performance. Further, based on a total weight of the nonaqueous solvent, a weight percentage of the high oxidation potential solvent is 20% to 40%.

In the nonaqueous electrolyte of this application, when a weight percentage of the carbonate solvent is lower, the effect of overcoming the disadvantages of high viscosity and the like of the high oxidation potential solvent is not obvious, and higher overall viscosity of the nonaqueous electrolyte has greater impact on the kinetic performance of the lithium-ion battery; and when a weight percentage of the carbonate solvent is higher, the nonaqueous electrolyte has poor oxidation resistance, is easy to decompose and generate gas in high pressure, and can greatly improve safety performance such as overcharge safety and hot box safety of the lithium-ion battery. Therefore, in some embodiments, based on a total weight of the nonaqueous solvent, a weight percentage of the carbonate solvent is 40% to 90%. In this case, the advantages of high oxidation resistance and non-flammability of the high oxidation potential solvent may be better combined with the advantages of low viscosity and dielectric constant of the carbonate solvent. Therefore, not only electrochemical performance of the lithium-ion battery under high temperature and high voltage may be improved, but also the lithium-ion battery may be ensured to have some kinetic performance. Further, based on a total weight of the nonaqueous solvent, a weight percentage of the carbonate solvent is 60% to 80%.

In the nonaqueous electrolyte of this application, in some embodiments, the high oxidation potential solvent contains at least one F atom, and presence of the F atom may better improve the oxidation resistance and flame retardancy of the high oxidation potential solvent.

In the nonaqueous electrolyte of this application, in some embodiments, in formula I, $R_1$ and $R_2$ are independently selected from unsubstituted, partially fluorinated or fully fluorinated alkyl groups having 1 to 5 carbon atoms, and at least one of $R_1$ and $R_2$ is a partially fluorinated or fully fluorinated alkyl group having 1 to 5 carbon atoms. Further, $R_1$ and $R_2$ are independently selected from —$CH_3$, —$CF_3$, —$CH_2CH_3$, —$CF_2CH_3$, —$CH_2CF_3$, —$CF_2CF_3$, —$CH_2CH_2CH_3$, —$CF_2CH_2CH_3$, —$CH_2CH_2CF_3$, —$CH_2CF_2CF_3$, —$CF_2CH_2CF_3$, —$CF_2CF_2CH_3$, and —$CF_2CF_2CF_3$, and at least one of $R_1$ and $R_2$ is —$CF_3$, —$CF_2CH_3$, —$CH_2CF_3$, —$CF_2CF_3$, —$CF_2CH_2CH_3$, —$CH_2CH_2CF_3$, —$CH_2CF_2CF_3$, —$CF_2CH_2CF_3$, —$CF_2CF_2CH_3$, or —$CF_2CF_2CF_3$.

In the nonaqueous electrolyte of this application, in some embodiments, in formula II, $R_3$ is selected from partially fluorinated or fully fluorinated alkylidene groups having 1 to 6 carbon atoms. Further, $R_3$ is selected from —$CHFCH_2CH_2CH_2$—, —$CF_2CH_2CH_2CH_2$—, —$CF_2CH_2CH_2CHF$—, —$CF_2CH_2CH_2CF_2$—, —$CH_2CH_2CHFCH_2$—, —$CH_2CHFCHFCH_2$—, —$CH_2CH_2CH(CF_3)CH_2$—, —$CF_2CH_2CH_2CH_2CH_2$—, —$CF_2CH_2CH_2CH_2CF_2$—, —$CH_2CH_2CH_2CHFCH_2$—, —$CH_2CHFCH_2CHFCH_2$—, —$CH_2CHFCH_2CHFCHF$—, —$CH_2CH_2CH_2CH_2CHF$—, —$CH_2CH_2CH_2CH(CF_3)CH_2$—, —$CF_2CH_2CH_2CH_2CH_2CH_2$—, —$CH_2CH_2CH_2CH_2CHFCH_2$—, —$CH_2CHFCH_2CH_2CHFCH_2$—, —$CF_2CH_2CH_2CH_2CH_2CF_2$—, —$CH_2CH_2CH(CH_3)CH_2CHFCH_2$—, and —$CH_2CH_2CH(CF_3)CH_2CHFCH_2$—.

In the nonaqueous electrolyte of this application, when the substituents $R_1$ and $R_2$ have a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_1$ and $R_2$ are independently selected from unsubstituted, partially halogenated or fully halogenated alkyl groups having 1 to 3 carbon atoms, and at least one of $R_1$ and $R_2$ is a partially halogenated or fully halogenated alkyl group having 1 to 3 carbon atoms. Further, $R_1$ and $R_2$ are independently selected from unsubstituted, partially fluorinated or fully fluorinated alkyl groups having 1 to 3 carbon atoms, and at least one of $R_1$ and $R_2$ is a partially fluorinated or fully fluorinated alkyl group having 1 to 3 carbon atoms.

In the nonaqueous electrolyte of this application, when the substituent $R_3$ has a large number of carbon atoms and a large molecular weight, the high oxidation potential solvent normally has high viscosity, and the nonaqueous electrolyte may have reduced overall electrical conductivity. This will affect the effect in improving electrochemical performance such as kinetic performance and cycle life of the lithium-ion battery. In some embodiments, $R_3$ is selected from partially halogenated or fully halogenated alkylidene groups having 1 to 4 carbon atoms. Further, $R_3$ is selected from partially fluorinated or fully fluorinated alkylidene groups having 1 to 4 carbon atoms.

In the nonaqueous electrolyte of this application, in some embodiments, the high oxidation potential solvent may be specifically selected from one or more of the following compounds:

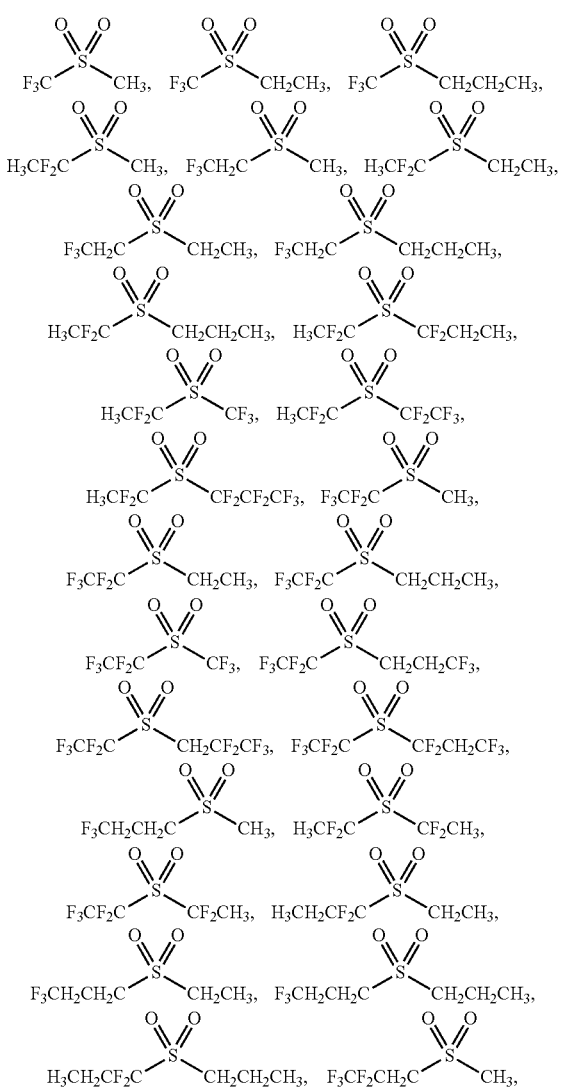

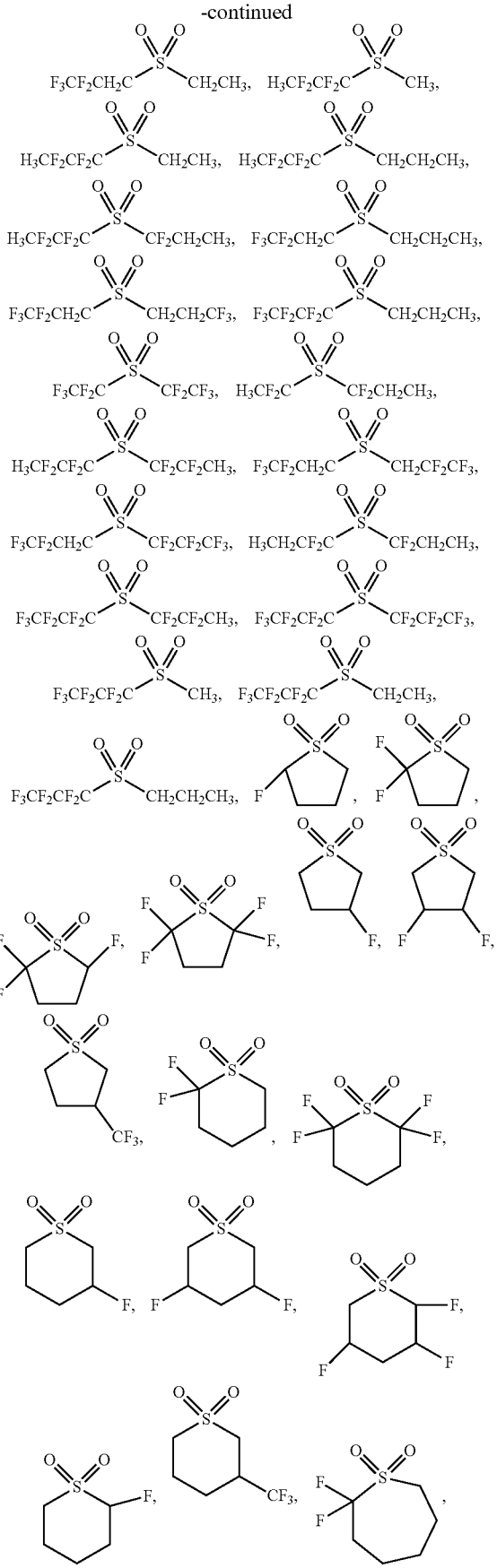

-continued

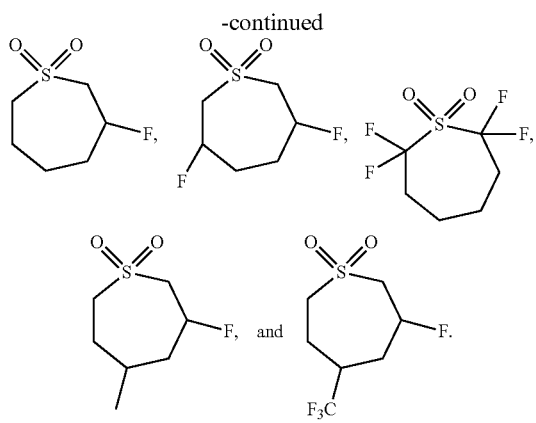

In the nonaqueous electrolyte of this application, the high oxidation potential solvent is selected from one or more of the compounds represented by formula I and formula II. By performing comparison between the two, the compound represented by formula I is characterized by lower viscosity and a lower dielectric constant, while the compound represented by formula II is characterized by higher viscosity and a higher dielectric constant. Therefore, in some embodiments, the high oxidation potential solvent includes both the compound represented by formula I and the compound represented by formula II. Further, the high oxidation potential solvent may only include the compound represented by formula I.

In the nonaqueous electrolyte of this application, in some embodiments, a weight of the compound represented by formula I accounts for 30% to 100% of a total weight of the high oxidation potential solvent, and a weight of the compound represented by formula II accounts for 0% to 70% of the total weight of the high oxidation potential solvent.

In the nonaqueous electrolyte of this application, in formula III, in some embodiments, $R_4$ is selected from unsubstituted, partially fluorinated, or fully fluorinated alkylidene groups having 1 to 6 carbon atoms; and further, $R_4$ is selected from unsubstituted, partially fluorinated, or fully fluorinated alkylidene groups having 2 to 4 carbon atoms.

In the nonaqueous electrolyte of this application, in some embodiments, the cyclic sulfate may be specifically selected from one or more of the following compounds and fluorinated compounds thereof:

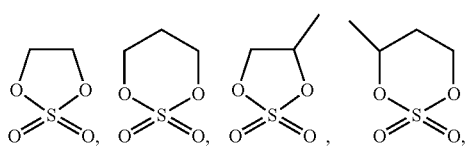

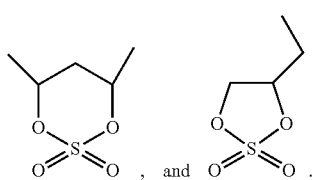

Further, the cyclic sulfate is

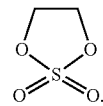

In the nonaqueous electrolyte of this application, when the percentage of the cyclic sulfate is low, side reactions of the high oxidation potential solvent on the negative electrode may not be completely suppressed, thereby affecting the improvement effect on the performance of the lithium-ion battery; and when the percentage of the cyclic sulfate is high, film-forming resistance of an interface between the positive and negative electrodes is greater, thereby further affecting the improvement effect on the performance of the lithium-ion battery. In some embodiments, based on the total weight of the nonaqueous electrolyte, a weight percentage of the cyclic sulfate is 0.1% to 10%, and further, the weight percentage of the cyclic sulfate is 0.5% to 5%.

In the nonaqueous electrolyte of this application, in some embodiments, the carbonate solvent may be selected from one or more of cyclic carbonate and linear carbonate. Further, the carbonate solvent is selected from linear carbonate or a mixture of linear carbonate and cyclic carbonate. The linear carbonate is characterized by low viscosity, and a defect of high viscosity of the high oxidation potential solvent may be effectively alleviated by adding the linear carbonate. The cyclic carbonate is characterized by a high dielectric constant. After the cyclic carbonate is added, solubility of the nonaqueous solvent to a lithium salt may be improved, and the defect of low dielectric constant of the high oxidation potential solvent is improved, which may effectively improve electrical conductivity of the nonaqueous electrolyte and contribute to obtaining a lithium-ion battery with good kinetic performance.

The cyclic carbonate is characterized by a high dielectric constant. After the cyclic carbonate is added, the solubility of the nonaqueous solvent to the lithium salt can increase and the conductivity of the nonaqueous electrolyte increases. However, the cyclic carbonate is easy to oxidize and generate gas in the positive electrode, and has relatively high heat release. Therefore, when the percentage of the cyclic carbonate is high, the improvement effect of the storage performance and safety performance of the lithium-ion battery is affected. In some embodiments, based on the total weight of the nonaqueous solvent, a weight percentage of the cyclic carbonate is 0 to 10%. Further, based on the total weight of the nonaqueous solvent, the weight percentage of the cyclic carbonate is 3% to 8%.

In some embodiments, a weight ratio of the linear carbonate to the cyclic carbonate is 80:1 to 1:1. Further, the weight ratio of the linear carbonate to the cyclic carbonate is 15:1 to 3:1.

The cyclic carbonate may be selected from one or more of compounds represented by formula IV, and the linear carbonate may be selected from one or more of compounds represented by formula V. In formula IV, $R_{11}$ is selected from unsubstituted alkyl groups having 1 to 5 carbon atoms. In formula V, $R_{12}$ and $R_{13}$ are selected from unsubstituted alkyl groups having 1 to 5 carbon atoms, and $R_{12}$ and $R_{13}$ may be the same, or may be different. In $R_{11}$, $R_{12}$, and $R_{13}$, an alkyl group may be in a linear structure or a branched structure.

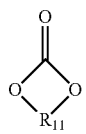

Formula IV and

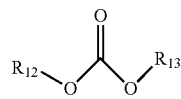

Formula V

In some embodiments, the cyclic carbonate may be specifically selected from one or more of ethylene carbonate and propylene carbonate, and the linear carbonate may be specifically selected from one or more of ethyl methyl carbonate, methyl propyl carbonate, methyl isopropyl carbonate, methyl butyl carbonate, ethylene propyl carbonate, dimethyl carbonate, diethyl carbonate, dipropyl carbonate and dibutyl carbonate.

In the nonaqueous electrolyte of this application, as viscosity of the high oxidation potential solvent is typically larger than that of the carbonate solvent, electrical conductivity of the nonaqueous electrolyte may be easily affected, thereby affecting charge and discharge capacity, a cycle life, and kinetic performance of the lithium-ion battery. Therefore, the electrical conductivity of the nonaqueous electrolyte may be improved by using the high oxidation potential solvent in combination with a suitable type of carbonate solvent to further improve charge and discharge capacity, cycle life, and kinetic performance of the lithium-ion battery. In some embodiments, room-temperature electrical conductivity of the nonaqueous electrolyte is controlled to be greater than or equal to 5.0 mS/cm. Among carbonate solvents, linear carbonate is generally characterized by low viscosity. As such, in some embodiments, the carbonate solvent includes at least linear carbonate. Further, the carbonate solvent includes at least one of ethyl methyl carbonate, dimethyl carbonate, and diethyl carbonate. The linear carbonate has even lower viscosity, and therefore may effectively make up for the defect of high viscosity of the high oxidation potential solvent.

In the nonaqueous electrolyte of this application, a specific type of the lithium salt is not specifically limited. The lithium salt may be any lithium salt used in existing batteries. For example, the lithium salt may be specifically selected from one or more of $LiPF_6$, $LiN(CF_3SO_2)_2$, $LiN(FSO_2)_2$, $LiBF_4$, $LiCF_3SO_3$, and $LiClO_4$. In order to further improve kinetic performance of the lithium-ion battery, in some embodiments, the lithium salt is $LiPF_6$.

In the nonaqueous electrolyte of this application, specific concentration of the lithium salt is not specifically limited either, and may be adjusted according to an actual need. For example, concentration of the lithium salt may specifically be 0.7 mol/L to 2 mol/L.

In the nonaqueous electrolyte of this application, in some embodiments, the nonaqueous electrolyte may further include other film-forming additives, and the film-forming additives help to further form an interface protective film of superior performance on the negative electrode and the positive electrode, thereby further improving electrochemical performance such as kinetic performance, cycle life, and storage life of the lithium-ion battery.

In some embodiments, based on the total weight of the nonaqueous electrolyte, a weight percentage of the film-forming additives is 0.01% to 10%. Further, based on the total weight of the nonaqueous electrolyte, the weight percentage of the film-forming additives is 0.1% to 5%.

In some embodiments, the film-forming additives may be specifically selected from one or more of a cyclic carbonate compound with an unsaturated bond, a halogen-substituted cyclic carbonate compound, a sulfite compound, a sultone compound, a disulfonate compound, a nitrile compound, an aromatic compound, an isocyanate compound, a phosphazene compound, a cyclic anhydride compound, a phosphite compound, a phosphate compound, a borate compound, and a carboxylate compound.

Further, the film-forming additives may be specifically selected from one or more of vinylene carbonate (VC), fluoroethylene carbonate (FEC), difluoroethylene carbonate (DFEC), 1,3-propane sultone (PS), 1,3-propene sultone (PES), adiponitrile (ADN), and succinonitrile (SN). These types of film-forming additives help to form a stable interface protective film on the negative electrode and the positive electrode, and effectively inhibit side reactions of the high oxidation potential solvent on the negative electrode and the positive electrode, thereby effectively improving electrochemical performance such as kinetic performance, cycle life, and storage life of the lithium-ion battery.

Further, the film-forming additives include at least 1,3-propane sultone (PS), that is, the nonaqueous electrolyte includes a mixed additive composed of cyclic sulfate (for example, DTD) and PS. A possible reason is that PS may also form a stable interface protective film on a surface of the positive electrode. Therefore, based on addition of the cyclic sulfate (for example, DTD), further addition of PS can further improve the oxidation resistance of the nonaqueous electrolyte, thereby further improving the electrochemical performance such as a cycle life and a storage life and safety performance such as overcharge safety and hot box safety of the lithium-ion battery.

Still further, the film-forming additives include at least both 1,3-propane sultone (PS) and fluoroethylene carbonate (FEC), that is, the nonaqueous electrolyte includes a mixed additive composed of cyclic sulfate (for example, DTD), PS, and FEC. A possible reason is that: FEC may also form a stable interface protective film on the negative electrode, and weaken reduction reactions of the cyclic sulfate on the negative electrode. This may help to improve film forming quality of the cyclic sulfate on a surface of the positive electrode, and may further facilitate improvement of cycle life of the lithium-ion battery.

Next, the lithium-ion battery according to the second aspect of this application is described.

Figure 2:
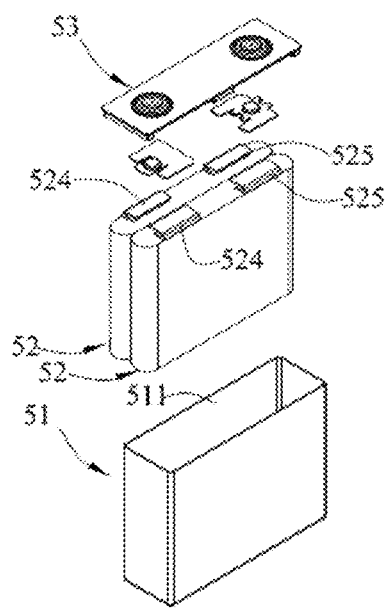
FIG. 2 is an exploded view of FIG. 1.
Figure 3:
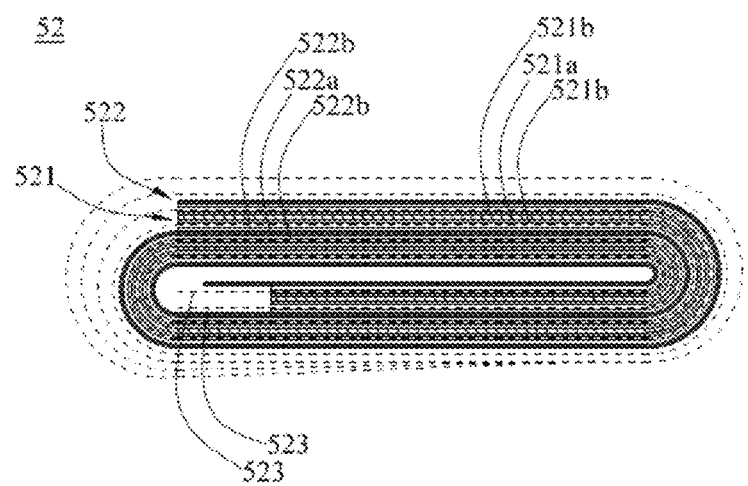
FIG. 3 is a schematic diagram of an embodiment of an electrode assembly of the lithium-ion battery in FIG. 2, in which a first electrode plate, a second electrode plate, and a separator are wound to form a wound electrode assembly.
Figure 4:
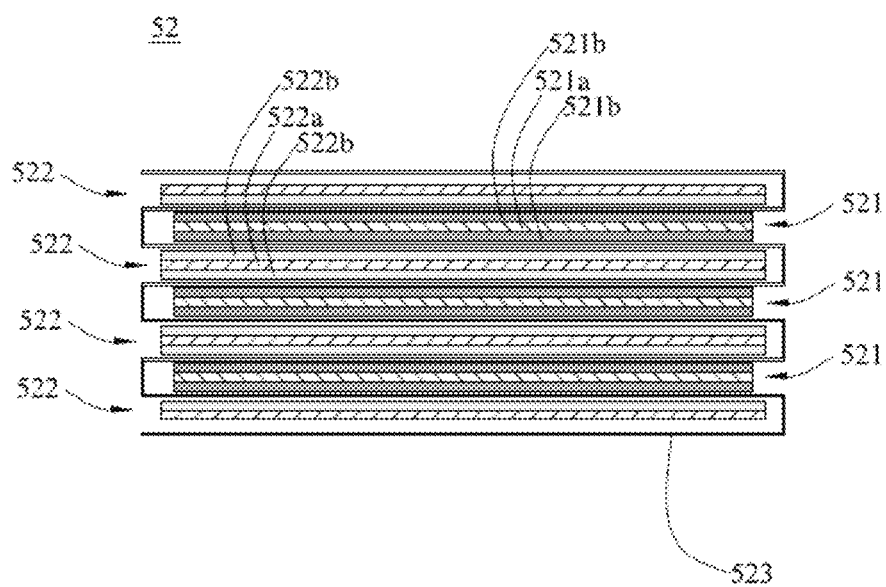
FIG. 4 is a schematic diagram of another embodiment of an electrode assembly of the lithium-ion battery in FIG. 2, in which a first electrode plate, a second electrode plate, and a separator are laminated along a thickness direction to form a laminated electrode assembly.

FIG. 1 is a perspective view of an embodiment of a lithium-ion battery 5. FIG. 2 is an exploded view of FIG. 1. FIG. 3 is a schematic diagram of an embodiment of an electrode assembly 52 of the lithium-ion battery 5 in FIG. 2, in which a first electrode plate 521, a second electrode plate 522, and a separator 523 are wound to form a wound electrode assembly. FIG. 4 is a schematic diagram of another embodiment of an electrode assembly 52 of the lithium-ion battery 5 in FIG. 2, in which a first electrode plate 521, a second electrode plate 522, and a separator 523 are laminated along a thickness direction to form a laminated electrode assembly.

With reference to FIG. 1 to FIG. 4, the lithium-ion battery 5 includes a housing 51, the electrode assembly 52, a top cover assembly 53, and an electrolyte (not shown).

The electrode assembly 52 is accommodated in the housing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b provided on a surface of the first current collector 521a. The first active material layer 521b contains a first active material. The first active material layer 521b may be provided on one surface or two surfaces of the first current collector 521a depending on an actual need. The second electrode plate 522 includes a second current collector 522a and a second active material layer 522b provided on a surface of the second current collector 522a. The second active material layer 522b may be provided on one surface or two surfaces of the second current collector 522a depending on an actual need. The second active material layer 522b contains a second active material. The first active material and the second active material implement deintercalation of lithium ions. Electrical polarities of the first electrode plate 521 and the second electrode plate 522 are opposite. To be specific, one of the first electrode plate 521 and the second electrode plate 522 is a positive electrode plate, and the other of the first electrode plate 521 and the second electrode plate 522 is a negative electrode plate. The first tab 524 may be formed by cutting the first current collector 521a, or may be formed separately and fixedly connected to the first current collector 521a. Similarly, the second tab 525 may be formed by cutting the second current collector 522a, or may be formed separately and fixedly connected to the second current collector 522a.

A quantity of the electrode assemblies 52 is not limited, and may be one or more.

The electrolyte is injected into the housing 51 and impregnates the electrode assembly 51. Specifically, the electrolyte impregnates the first electrode plate 521, the second electrode plate 522, and the separator 523.

It is noted that the lithium-ion battery 5 shown in FIG. 1 is a tank type battery, but is not limited thereto. The lithium-ion battery 5 may be a pouch type battery, which means that the housing 51 is replaced by a metal plastic film and the top cover assembly 53 is eliminated.

In the lithium-ion battery 5, as one of the first electrode plate 521 and the second electrode plate 522 is the positive electrode plate, a current collector of the positive electrode plate is a positive current collector, an active material layer of the positive electrode plate is a positive active material layer, and an active material of the positive electrode plate is a positive active material. As such, the positive electrode plate includes the positive current collector and the positive active material layer provided on a surface of the positive current collector.

In another word, the lithium-ion battery according to the second aspect of this application includes a positive electrode plate, a negative electrode plate, a separator and the nonaqueous electrolyte according to the first aspect of this application.

In the lithium-ion battery in this application, the positive electrode plate may include a positive active material, a conductive agent and a binder. The positive active material may be selected from a layered lithium-containing oxide, a spinel-type lithium-containing oxide, and the like. Specifically, the positive active material may be selected from one or more of a lithium cobalt oxide, a lithium nickel oxide, a lithium manganese oxide, a lithium nickel manganese oxide, a lithium nickel cobalt manganese oxide, and a lithium nickel cobalt aluminum oxide. However, this application is not limited to these materials, and other conventionally well-known materials that can be used as a positive active material of a lithium-ion battery may also be used. One type of these positive active materials may be used alone, or two or more types may be used in combination, at a combination ratio adjustable depending on an actual need. Types of the conductive agent and the binder are not specifically limited, and may be selected depending on an actual need.

When voltage of the lithium-ion battery is higher, the lithium-ion battery may have higher charge and discharge capacity and higher energy density, but a conventional electrolyte may be oxidized to generate gas and release heat. This may change service life and high-temperature performance of the lithium-ion battery, especially in the process of abuse. For example, at a 150° C. hot box, the lithium-ion battery may easily burn. However, the nonaqueous electrolyte of this application contains a high oxidation potential solvent, which can greatly improve oxidation resistance of the nonaqueous electrolyte and reduce heat release, thereby effectively improving high-temperature performance of the lithium-ion battery. As such, the nonaqueous electrolyte in this application can more significantly improve performance of a battery system with high positive electrode oxidation or high positive electrode oxidation potential, especially electrochemical performance of the lithium-ion battery under high temperature and high voltage. Gas generation of the lithium-ion battery under high temperature and high voltage may be even more significantly suppressed, and safety performance such as overcharge safety and hot box safety of the lithium-ion battery may also be more significantly improved.

In some embodiments, the positive active material is one or more of $Li_{1+x}Ni_aCo_bM'_{(1-a-b)}O_{2-c}Y_c$, and $Li_{1+y}Ni_mM_{nn}M''_{2-m-n}O_{4-p}Z_p$, where $-0.1 \leq x \leq 0.2$, $0.6 \leq a \leq 1$, $0 \leq b < 1$, $0 \leq (1-ab) < 1$, $0 \leq c < 1$, M' is selected from one or more of Mn, Al, Mg, Zn, Ga, Ba, Fe, Cr, Sn, V, Sc, Ti, and Zr, and Y is selected from one or more of F, Cl, and Br; $-0.1 \leq y \leq 0.2$, $0.4 \leq m \leq 1.2$, $0.8 \leq n \leq 1.6$, $0 \leq (2-m-n) \leq 0.3$, $0 \leq p \leq 1$, M" is selected from one or more of Al, Mg, Zn, Ga, Ba, Fe, Cr, Sn, V, Sc, Ti, and Zr, and Z is selected from one or more of F, Cl, and Br. Further, the positive active material may be specifically selected from one or more of $LiNi_{0.6}Co_{0.2}Mn_{0.2}O_2$, $LiNi_{0.8}Co_{0.1}Mn_{0.1}O_2$, $LiNi_{0.85}Co_{0.15}Al_{0.05}O_2$, and $LiNi_{0.5}Mn_{1.5}O_4$. As Ni content in the positive active material increases, the positive active material has increased charge and discharge capacity, but reduced thermal stability. As such, the positive active material may release a strong oxidizing substance under high temperature, oxidizing the nonaqueous electrolyte and deteriorating high-temperature performance of the lithium-ion battery. The nonaqueous electrolyte of this application contains an oxidation resistant high oxidation potential solvent, which can greatly improve oxidation resistance of the nonaqueous electrolyte and reduce heat release, thereby effectively improving high-temperature performance of the lithium-ion battery.

In the lithium-ion battery in this application, in some embodiments, an end-of-charge voltage of the lithium-ion battery is U, where $4.3V \leq U \leq 6V$. That is, the nonaqueous electrolyte in this application may increase the end-of-charge voltage of the lithium-ion battery to 4.3V or more.

In the lithium-ion battery in this application, the negative electrode plate may include a negative active material, a conductive agent and a binder. The negative active material may be selected from a carbon-based material, a silicon-based material, a tin-based material, and the like. Specifically, the negative active material may be selected from soft carbon, hard carbon, artificial graphite, natural graphite, silicon, silicon oxide, silicon carbon composite, silicon alloy, tin, tin oxide, tin alloy, lithium titanate, a metal that can form an alloy with lithium, and the like. However, this application is not limited to these materials, and other conventionally well-known materials that can be used as a negative active material of a lithium-ion battery may also be used. One type of these negative active materials may be used alone, or two or more types may be used in combination, at a combination ratio adjustable depending on an actual need. Types of the conductive agent and the binder are not specifically limited, and may be selected depending on an actual need.

In the lithium-ion battery of this application, a specific type of the separator is not specifically limited, and the separator may be made of any separator material used in existing batteries, such as a polyolefin separator, a ceramic separator, or the like. Specifically, the separator may be a polyethylene film, a polypropylene film, a polyvinylidene fluoride film, or a multilayer composite film thereof, but this application is not limited thereto.

Next, the battery module according to the third aspect of this application is described.

Figure 5:
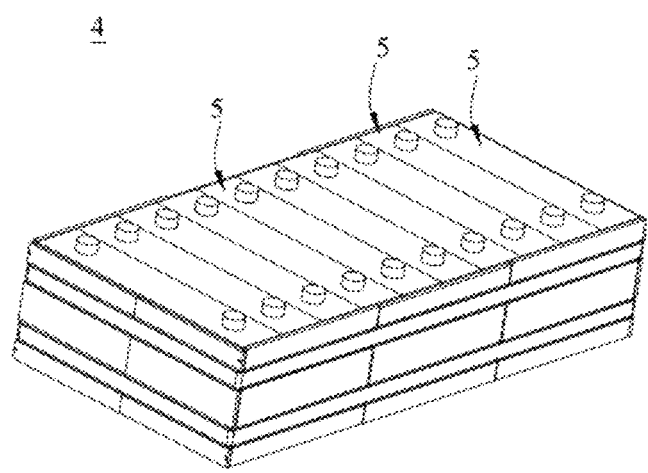
FIG. 5 is a perspective view of an embodiment of a battery module.

FIG. 5 is a perspective view of an embodiment of a battery module 4.

The battery module 4 of the third aspect of this application includes the lithium-ion battery 5 according to the second aspect of this application.

Referring to FIG. 5, the battery module 4 includes a plurality of lithium-ion batteries 5. The plurality of lithium-ion batteries 5 are arranged in a longitudinal direction. The battery module 4 may be used as a power supply or an energy storage apparatus. A quantity of secondary batteries 5 included in the battery module 4 may be adjusted based on use and capacity of the battery module 4.

A battery pack according to a fourth aspect of this application is described next.

Figure 6:
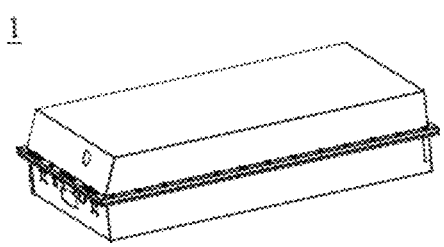
FIG. 6 is a perspective view of an embodiment of a battery pack.
Figure 7:
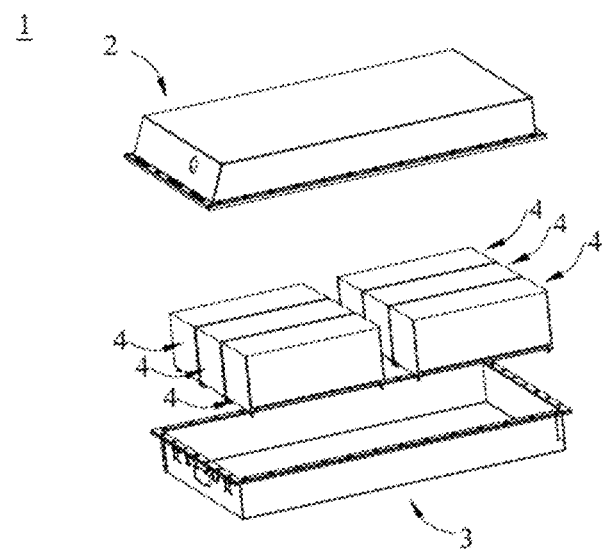
FIG. 7 is an exploded view of FIG. 6.

FIG. 6 is a perspective view of an embodiment of a battery pack 1. FIG. 7 is an exploded view of FIG. 6.

The battery pack 1 provided in the fourth aspect of this application includes the battery module 4 according to the third aspect of this application.

Specifically, referring to FIG. 6 and FIG. 7, the battery pack 1 includes an upper box body 2, a lower box body 3, and the battery module 4. The upper box body 2 and the lower box body 3 are assembled together to form a space for accommodating the battery module 4. The battery module 4 is disposed in the space formed by the upper box body 2 and the lower box body 3 that are assembled together. An output electrode of the battery module 4 penetrates through one or both of the upper box body 2 and the lower box body 3 to output power or to charge from an outer source. A quantity and an arrangement of the battery modules 4 used in the battery pack 1 may be determined depending on an actual need. The battery pack 1 may be used as a power supply or an energy storage apparatus.

An apparatus according to a fifth aspect of this application is described next.

Figure 8:
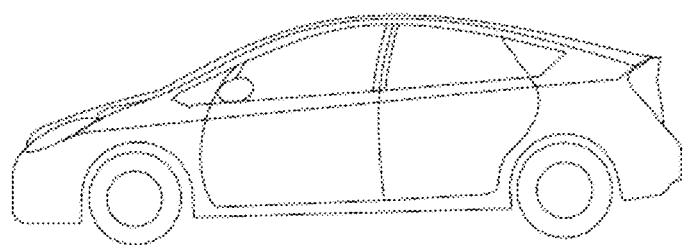
FIG. 8 is a schematic diagram of an embodiment of an apparatus using a lithium-ion battery as a power supply.

FIG. 8 is a schematic diagram of an embodiment of an apparatus using a lithium-ion battery as a power supply.

The apparatus provided in the fifth aspect of this application includes the lithium-ion battery 5 according to the second aspect of this application, where the lithium-ion battery 5 is used as a power supply for the apparatus. In FIG. 8, the apparatus using the lithium-ion battery 5 is an electromobile. The apparatus using the lithium-ion battery 5 is obviously not limited to this, but may be any electric vehicles other than electromobiles (for example, an electric bus, an electric tram, an electric bicycle, an electric motorcycle, an electric scooter, an electric golf cart, and an electric truck), an electric vessel, an electric tool, an electronic device, and an energy storage system. The electromobile may be a pure electric vehicle, a hybrid electric vehicle, or a plug-in hybrid electric vehicle. Certainly, depending on an actual use form, the apparatus provided in the fifth aspect of this application may include the battery module 4 according to the third aspect of this application. Certainly, the apparatus provided in the fifth aspect of this application may also include the battery pack 1 according to the fourth aspect of this application.

To make the application objectives, technical solutions, and beneficial technical effects of this application clearer, this application is further described below in detail with reference to examples. It should be understood that the examples described in this specification are merely intended to explain this application, but not to limit this application. Formulations, proportions, and the like in the examples may be selected as appropriate to local conditions, which have no substantial effect on results.

For ease of explanation, reagents used in the preparation of nonaqueous electrolyte are abbreviated as follows:

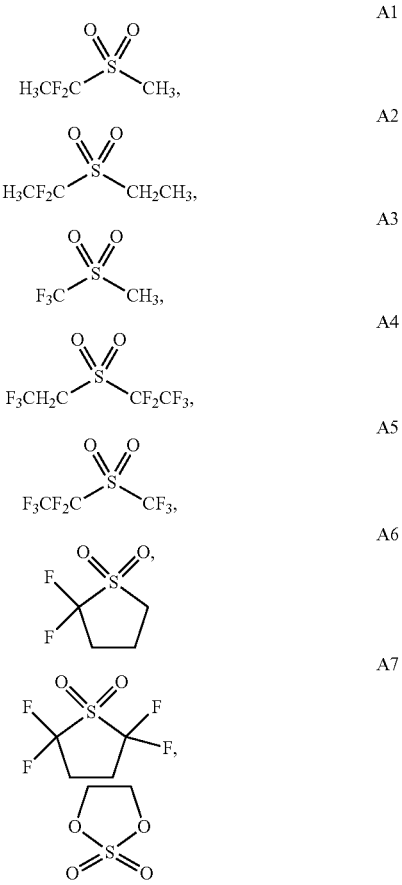

Example 1

(1) Preparation of a Nonaqueous Electrolyte

A compound A1, ethyl methyl carbonate (EMC), and ethylene carbonate (EC) were mixed at a weight ratio of 60:35:5 to be used as a nonaqueous solvent; 1 mol/L LiPF$_6$ was dissolved as a lithium salt; and 2% DTD was added to prepare a nonaqueous electrolyte.

(2) Preparation of a positive electrode plate

A positive active material LiNi$_{0.8}$Co$_{0.1}$Mn$_{0.1}$O$_2$, an acetylene black conductive agent, and a polyvinylidene fluoride (PVDF) binder were fully stirred and uniformly mixed in an N-methylpyrrolidone solvent system at a weight ratio of 94:3:3, and then the mixture was applied onto a current collector Al foil, followed by drying and cold pressing to obtain a positive electrode plate.

(3) Preparation of a Negative Electrode Plate

A negative active material artificial graphite, an acetylene black conductive agent, a styrene-butadiene rubber binder, a sodium carboxymethyl cellulose thickener were fully stirred and uniformly mixed at a weight ratio of 95:2:2:1 in a deionized water solvent system, and then the mixture was applied onto a current collector Cu foil, followed by drying and cold pressing to obtain a negative electrode plate.

(4) Preparation of a Separator

A polyethylene film was used as a separator.

(5) Preparation of a Lithium-Ion Battery

The positive electrode plate, the separator, and the negative electrode plate were laminated in order, so that the separator was interposed between the positive electrode plate and negative electrode plate to provide separation. Then the laminated product was wound to obtain an electrode assembly. The electrode assembly was placed in an outer package and dried, and the nonaqueous electrolyte was then injected. Then, after vacuum packaging, standing, chemical conversion, shaping, and other processes, a lithium-ion battery was obtained.

The lithium-ion batteries in Examples 2 to 29 and Comparative Examples 1 to 7 were all prepared according to a method similar to that in Example 1, and specific differences are shown in Table 1.

TABLE 1

Compositions of the nonaqueous electrolytes prepared in Examples 1 to 29 and Comparative Examples 1 to 7

| | Composition of nonaqueous solvent and weight percentages of individual components | | | | | | Additive | | Other film-forming additives | |
|---|---|---|---|---|---|---|---|---|---|---|
| | High oxidation potential solvent | | Linear carbonate | | Cyclic carbonate | | Component | Percentage | Component | Percentage |
| Example 1 | A1 | 60% | EMC | 35% | EC | 5% | DTD | 2% | / | / |
| Example 2 | A1 | 50% | EMC | 45% | EC | 5% | DTD | 2% | / | / |
| Example 3 | A1 | 40% | EMC | 55% | EC | 5% | DTD | 2% | / | / |
| Example 4 | A1 | 30% | EMC | 65% | EC | 5% | DTD | 2% | / | / |
| Example 5 | A1 | 20% | EMC | 75% | EC | 5% | DTD | 2% | / | / |
| Example 6 | A1 | 10% | EMC | 85% | EC | 5% | DTD | 2% | / | / |
| Example 7 | A1 | 70% | EMC | 25% | EC | 5% | DTD | 2% | / | / |
| Example 8 | A1 | 5% | EMC | 90% | EC | 5% | DTD | 2% | / | / |
| Example 9 | A1 | 30% | EMC | 70% | / | / | DTD | 2% | / | / |
| Example 10 | A1 | 30% | EMC | 65% | EC | 5% | DTD | 0.1% | / | / |
| Example 11 | A1 | 30% | EMC | 65% | EC | 5% | DTD | 0.5% | / | / |
| Example 12 | A1 | 30% | EMC | 65% | EC | 5% | DTD | 1% | / | / |
| Example 13 | A1 | 30% | EMC | 65% | EC | 5% | DTD | 3% | / | / |
| Example 14 | A1 | 30% | EMC | 65% | EC | 5% | DTD | 5% | / | / |
| Example 15 | A1 | 30% | EMC | 65% | EC | 5% | DTD | 8% | / | / |
| Example 16 | A1 | 30% | EMC | 65% | EC | 5% | DTD | 10% | / | / |
| Example 17 | A2 | 30% | EMC | 65% | EC | 5% | DTD | 2% | / | / |
| Example 18 | A3 | 30% | EMC | 65% | EC | 5% | DTD | 2% | / | / |
| Example 19 | A4 | 30% | EMC | 65% | EC | 5% | DTD | 2% | / | / |
| Example 20 | A5 | 30% | EMC | 65% | EC | 5% | DTD | 2% | / | / |
| Example 21 | A6 | 30% | EMC | 65% | EC | 5% | DTD | 2% | / | / |
| Example 22 | A7 | 30% | EMC | 65% | EC | 5% | DTD | 2% | / | / |
| Example 23 | A1:A6 = 70:30 | 30% | EMC | 65% | EC | 5% | DTD | 2% | / | / |
| Example 24 | A2:A7 = 60:40 | 30% | EMC | 65% | EC | 5% | DTD | 2% | / | / |
| Example 25 | A1 | 30% | EMC | 65% | EC | 5% | DTD | 2% | PS | 2% |
| Example 26 | A1 | 30% | EMC | 65% | EC | 5% | DTD | 2% | PS + FEC | 1% + 1% |
| Example 27 | A1 | 30% | EMC | 65% | EC | 5% | DTD | 2% | VC | 2% |
| Example 28 | A1 | 30% | EMC | 65% | EC | 5% | DTD | 2% | PES | 2% |
| Example 29 | A1 | 30% | EMC | 65% | EC | 5% | DTD | 2% | ADN | 2% |
| Comparative Example 1 | / | / | EMC | 70% | EC | 30% | DTD | 2% | / | / |
| Comparative Example 2 | A1 | 100% | / | / | / | / | DTD | 2% | / | / |
| Comparative Example 3 | Methyl ethyl sulfone | 30% | EMC | 65% | EC | 5% | DTD | 2% | / | / |
| Comparative Example 4 | A1 | 30% | EMC | 65% | EC | 5% | PS | 2% | / | / |
| Comparative Example 5 | A1 | 30% | EMC | 65% | EC | 5% | VC | 2% | / | / |
| Comparative Example 6 | A1 | 30% | EMC | 65% | EC | 5% | PES | 2% | / | / |
| Comparative Example 7 | A1 | 30% | EMC | 65% | EC | 5% | ADN | 2% | / | / |

Performance tests for the lithium-ion batteries are described next.

(1) High-Temperature Storage Gas Generation Test

Five lithium-ion batteries prepared in the Examples and five lithium-ion batteries prepared in the Comparative Examples were taken and placed at room temperature, charged to 4.3V at a constant current of 0.5 C (that is, a current value at which the battery completely discharges its theoretical capacity in 2 h), and then charged at a constant voltage of 4.3V until that the current was lower than 0.05 C, such that the lithium-ion batteries were in a 4.3V fully charged state. A volume of a fully charged battery before storage was denoted as D0. The fully charged battery was placed in an oven at 85° C., taken out after 10 hours, and tested for a volume after storage, where the volume after storage was denoted as D1.

A volume swelling ratio of the lithium-ion battery was $\varepsilon = (D1-D0)/D0 \times 100\%$.

(2) Thermal Shock Safety Performance (Hot Box) Test

Five lithium-ion batteries prepared in the Examples and five lithium-ion batteries prepared in the Comparative Examples were taken and placed at room temperature, charged to 4.3V at a constant current of 0.5 C, and then charged at a constant voltage of 4.3V until the current was lower than 0.05 C. The lithium-ion batteries were then placed in a thermostat, and the thermostat was heated to 150° C. at a heating rate of 5° C./min. Time h1 required for the thermostat to heat up from room temperature to 150° C. was recorded. The lithium-ion battery was then baked in the 150° C. thermostat until the lithium-ion battery caught smoke and a fire. Time h2 from when the thermostat was heated up from room temperature until when the lithium-ion battery caught smoke and a fire was recorded.

The thermal shock safety performance of the lithium-ion battery was characterized by time (h2−h1) for which the lithium-ion battery withstood baking at 150° C.

(3) Cycle Performance Test

Five lithium-ion batteries prepared in the Examples and five lithium-ion batteries prepared in Comparative Examples were repeatedly charged and discharged through the following steps, and discharge capacity retention rates of the lithium-ion batteries were calculated.

First, in a room temperature environment, a first cycle of charge and discharge was performed, where the lithium-ion batteries were charged at a constant current of 0.5 C to an upper limit voltage of 4.3V, and then charged at a constant voltage of 4.3V until the current was lower than 0.05 C, and then discharged at a constant discharge current of 0.5 C until a final voltage was 3V. A discharge capacity of the first cycle was recorded. 200 charge and discharge cycles were performed according to the above operations and a discharge capacity of the $200^{th}$ cycle was recorded.

Cycle capacity retention rate of the lithium-ion battery=(Discharge capacity at the $200^{th}$ cycle/Discharge capacity at the first cycle)×100%.

(4) Kinetic Performance Test

Five lithium-ion batteries prepared in the Examples and five lithium-ion batteries prepared in the Comparative Examples were taken, and then tested in a room temperature environment. First, the lithium-ion batteries were charged at a constant current of 0.5 C to an upper limit voltage of 4.3V, and then charged at a constant voltage of 4.3V until the current was lower than 0.05 C, and then discharged at a constant current with different rates (0.5 C, 2 C) until a final voltage was 3V. Discharge capacities at different rates were recorded.

The kinetic performance of the lithium-ion battery was characterized by a ratio of a discharge capacity at a rate of 2 C of the lithium-ion battery to a discharge capacity at a rate of 0.5 C of the lithium-ion battery.

TABLE 2

Performance test results of Examples 1 to 29 and the Comparative Examples 1 to 7

| | Volume swelling ratio ε | Hot box safety performance h2-h1 (min) | Capacity retention rate after cycling | 2 C./0.5 C. |
|---|---|---|---|---|
| Example 1 | 3% | 61 | 66% | 58% |
| Example 2 | 5% | 57 | 71% | 61% |
| Example 3 | 6% | 55 | 76% | 64% |
| Example 4 | 7% | 52 | 80% | 67% |
| Example 5 | 8% | 41 | 84% | 69% |
| Example 6 | 9% | 32 | 85% | 76% |
| Example 7 | 2% | 65 | 56% | 49% |
| Example 8 | 11% | 18 | 86% | 79% |
| Example 9 | 6% | 54 | 65% | 45% |
| Example 10 | 15% | 47 | 76% | 63% |
| Example 11 | 12% | 49 | 77% | 64% |
| Example 12 | 9% | 51 | 78% | 65% |
| Example 13 | 6% | 54 | 82% | 69% |
| Example 14 | 5% | 57 | 83% | 70% |
| Example 15 | 4% | 59 | 79% | 67% |
| Example 16 | 3% | 60 | 54% | 42% |
| Example 17 | 7% | 53 | 80% | 67% |
| Example 18 | 8% | 52 | 81% | 66% |
| Example 19 | 6% | 51 | 80% | 68% |
| Example 20 | 7% | 52 | 79% | 67% |
| Example 21 | 5% | 55 | 77% | 61% |
| Example 22 | 4% | 57 | 76% | 59% |
| Example 23 | 6% | 53 | 78% | 64% |
| Example 24 | 6% | 54 | 77% | 63% |
| Example 25 | 3% | 57 | 85% | 69% |
| Example 26 | 4% | 54 | 87% | 64% |
| Example 27 | 11% | 46 | 82% | 64% |
| Example 28 | 2% | 60 | 80% | 61% |
| Example 29 | 5% | 55 | 72% | 56% |
| Comparative Example 1 | 67% | 6 | 92% | 87% |
| Comparative Example 2 | 4% | 67 | 49% | 39% |
| Comparative Example 3 | 10% | 22 | 82% | 69% |
| Comparative Example 4 | 4% | 55 | 73% | 55% |
| Comparative Example 5 | 20% | 42 | 78% | 60% |
| Comparative Example 6 | 4% | 56 | 76% | 57% |
| Comparative Example 7 | 12% | 51 | 68% | 52% |

It can be seen from the test results of Comparative Examples 1 and 2 and Examples 1 to 9 that, when a mixed solvent formed by the high oxidation potential solvent and the carbonate solvent were used with the additive cyclic sulfate, high-temperature storage performance and hot box safety performance of the lithium-ion battery could be significantly improved, and the lithium-ion battery also had good cycle performance and kinetic performance.

This is because the high oxidation potential solvent had the advantages of high oxidation resistance and non-flammability. After the high oxidation potential solvent was mixed with the carbonate solvent, disadvantages of the carbonate solvent such as poor oxidation resistance, easy high-pressure decomposition and gas generation, a low flash point, and easy combustion could be overcome, and therefore high-temperature storage performance and hot box safety performance of the lithium-ion battery could be greatly improved. However, although the high oxidation potential solvent had the advantages of oxidation resistance and non-flammability, the high oxidation potential solvent had poor compatibility with the negative electrode and might cause side reactions on the negative electrode. In addition, viscosity of the high oxidation potential solvent was higher than that of the carbonate solvent. After the high oxidation potential solvent was added, overall viscosity of the nonaqueous electrolyte increased greatly, ionic conduction became slow, and electrical conductivity decreased, so that cycle performance and kinetic performance of the lithium-ion battery were deteriorated. The additive cyclic sulfate might first form a stable interface protective film on the negative electrode, thereby suppressing side reactions of the high oxidation potential solvent on the negative electrode. In addition, the cyclic sulfate might generate lithium sulfate that structurally contained an alkoxy structure (—$CH_2CH_2O$—) in the process of film forming on the negative electrode. This could effectively adjust viscoelasticity of the interface protective film on the negative electrode, improve kinetics of lithium ion transfer at the interface, and finally form a thin and dense interface protective film with good kinetics of lithium ion transfer on the negative electrode. Therefore, the cyclic sulfate could effectively make up for the defects of the high oxidation potential solvent with the high viscosity and poor compatibility with the negative electrode, and be conducive to obtain the lithium-ion battery with good cycle performance and kinetic performance. In addition, the additive cyclic sulfate might also form a stable interface protective film on a surface of the positive electrode to further improve oxidation resistance of the nonaqueous electrolyte. Therefore, this was beneficial to improve hot box safety performance of the lithium-ion battery to some extent.

In Comparative Example 1, the nonaqueous solvent did not include the high oxidation potential solvent, but only a conventional carbonate solvent, the nonaqueous solvent had disadvantages such as poor oxidation resistance, easy high-pressure decomposition and gas generation, a low flash point, and easy combustion, and therefore high-temperature storage performance and hot box safety performance of the lithium-ion battery were poor. In Comparative Example 2, the nonaqueous solvent did not include the carbonate solvent, but only the high oxidation potential solvent, and the nonaqueous solvent had higher viscosity, resulting in higher overall viscosity and lower electrical conductivity of the nonaqueous electrolyte. Therefore, cycle performance and kinetic performance of the lithium-ion battery were significantly deteriorated.

It can be seen from the test results of Examples 1 to 9 that, when the weight percentage of the high oxidation potential solvent was relatively low, the effect in overcoming the disadvantages of carbonate solvents such as poor oxidation resistance, easy high-pressure decomposition and gas generation, a low flash point and easy combustion was not obvious; and when the weight percentage of the high oxidation potential solvent was relatively high, overall viscosity of the nonaqueous electrolyte increased greatly, and conductivity decreased, which had greater impact on kinetic performance of the lithium-ion battery. Therefore, in some embodiments, based on a total weight of the nonaqueous solvent, a weight percentage of the high oxidation potential solvent is 10% to 60%.

It can also be seen from the test results of Examples 10 to 16 that, when the percentage of the cyclic sulfate was relatively low, side reactions of the high oxidation potential solvent on the negative electrode might not be completely suppressed, thereby affecting the improvement effect on the performance of the lithium-ion battery; and when the percentage of the cyclic sulfate was relatively high, film-forming resistance of an interface between the positive and negative electrodes was greater, thereby further affecting the improvement effect on the performance of the lithium-ion battery. Therefore, in some embodiments, based on a total weight of the nonaqueous electrolyte, a weight percentage of the cyclic sulfate is 0.1% to 10%.

It can be seen from the test results of Comparative Example 3 and Example 4 and Examples 17 to 24 that the high oxidation potential solvents that had not been fluorinated had poorer oxidation resistance and did not exhibit flame retardancy, so that the effect in improving hot box safety performance of the lithium-ion batteries was not desirable.

It can be also seen from the test results of Example 4 and Examples 17 to 24 that the high oxidation potential solvents of different structures also had some impact on performance of the lithium-ion batteries. The high oxidation potential solvent of a cyclic structure was characterized by higher viscosity and higher dielectric constant, and the high oxidation potential solvent of a linear structure was characterized by lower viscosity and lower dielectric constant. Therefore, in some embodiments, the high oxidation potential solvent includes both a high oxidation potential solvent of a linear structure and a high oxidation potential solvent of a cyclic structure. Further, the high oxidation potential solvent only includes a high oxidation potential solvent of a linear structure.

It can be seen from the test results of Comparative Examples 4 to 8 and Example 4 and Examples 25 to 29 that after a film-forming additive, such as PS, VC, PES, ADN, or FEC, was further added into the nonaqueous electrolyte including the high oxidation potential solvent, the carbonate solvent, and the cyclic sulfate, the lithium-ion battery had further improved comprehensive performance. A possible reason is that the film-forming additive had some film-forming effect on both the positive electrode and the negative electrode, and the formed film had good stability, which inhibited continuous side reactions of the nonaqueous electrolyte during use of the battery. As such, impedance of the interface protective films on the positive electrode and negative electrode increased more slowly, and performance of the lithium-ion battery was better.

However, directly adding PS, VC, PES, and ADN to the nonaqueous electrolyte that did not include DTD could also improve the performance of the lithium-ion battery to some extent, but the improvement effect of the film-forming additives was worse than that of DTD. Possible reasons are: As film-forming resistance of PS and PES was higher than that of DTD, it was difficult to form a thin and dense interface protective film with good lithium ion migration kinetics on the negative electrode. The kinetic performance of the lithium-ion battery was poor. VC usually formed a film only on the negative electrode, and oxidized and generated gas on the positive electrode. The high-temperature storage performance and the safety performance of the hot box of the lithium-ion battery were poor. ADN usually acted on only the positive electrode to inhibit the dissolution of metal ions, and also brought side reactions on the negative electrode. Therefore, the defect of poor compatibility between the high oxidation potential solvent and the negative electrode could not be improved, and the kinetic performance of the lithium-ion battery was poor.

Furthermore, when FEC was further added to the nonaqueous electrolyte including DTD and PS, the performance of the lithium-ion battery, especially the cycle performance, was further improved. A possible reason is that: FEC might also be reduced on the negative electrode to form a stable interface protective film, thereby weakening reduction reactions of DTD on the negative electrode. This might help to further improve film forming quality of DTD on a surface of the positive electrode, which further facilitated improvement of cycle performance of the lithium-ion batteries.

According to the disclosure and teaching of this specification, a person skilled in the art of this application may further make appropriate changes or modifications to the foregoing implementations. Therefore, this application is not limited to the foregoing disclosure and the described specific implementations, and some changes or modifications to this application shall also fall within the protection scope of the claims of this application. In addition, although some specific terms are used in the specification, these terms are used only for ease of description, and do not constitute any limitation on this application.

What is claimed is:

1. A lithium-ion battery, comprising a nonaqueous electrolyte comprising a nonaqueous solvent, a lithium salt, and an additive, wherein
the nonaqueous solvent comprises a carbonate solvent and a high oxidation potential solvent, the additive comprises cyclic sulfate;
the high oxidation potential solvent is selected from one or more of compounds represented by formula I and formula II;

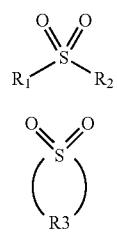

Formula I

Formula II in formula I, $R_1$ and $R_2$ are independently selected from unsubstituted, partially halogenated, or fully halogenated alkyl groups having 1 to 5 carbon atoms, and at least one of $R_1$ and $R_2$ is a partially halogenated or fully halogenated alkyl group having 1 to 5 carbon atoms; and in formula II, $R_3$ is selected from partially halogenated or fully halogenated alkylidene groups having 3 to 6 carbon atoms;
the cyclic sulfate is selected from one or more of compounds represented by formula III;

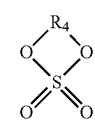

Formula III in formula III, $R_4$ is selected from alkylidene groups having 2 to 6 carbon atoms without halogen substitution; and
the halogenated groups in formula I and II comprise a halogen atom selected from one or more of F, Cl, Br, and I;
wherein based on a total weight of the non-aqueous solvent, a weight percentage of the high oxidation potential solvent is 10% to 60%;
a weight percentage of the cyclic sulfate solvent is 0.1% to 10%; and
a weight percentage of the carbonate solvent is 40% to 90%.

2. The lithium-ion battery according to claim 1, wherein
in formula I, $R_1$ and $R_2$ are independently selected from unsubstituted, partially fluorinated, or fully fluorinated alkyl groups having 1 to 5 carbon atoms, and at least one of $R_1$ and $R_2$ is a partially fluorinated or fully fluorinated alkyl group having 1 to 5 carbon atoms; and $R_1$ and $R_2$ are independently selected from —CH$_3$, —CF$_3$, —CH$_2$CH$_3$, —CF$_2$CH$_3$, —CH$_2$CF$_3$, —CF$_2$CF$_3$, —CH$_2$CH$_2$CH$_3$, —CF$_2$CH$_2$CH$_3$, —CH$_2$CH$_2$CF$_3$, —CH$_2$CF$_2$CF$_3$, —CF$_2$CH$_2$CF$_3$, —CF$_2$CF$_2$CH$_3$, and —CF$_2$CF$_2$CF$_3$, and at least one of $R_1$ and $R_2$ is —CF$_3$, —CF$_2$CH$_3$, —CH$_2$CF$_3$, —CF$_2$CF$_3$, —CF$_2$CH$_2$CH$_3$, —CH$_2$CH$_2$CF$_3$, —CH$_2$CF$_2$CF$_3$, —CF$_2$CH$_2$CF$_3$, —CF$_2$CF$_2$CH$_3$, or —CF$_2$CF$_2$CF$_3$; and
in formula II, $R_3$ is selected from partially fluorinated or fully fluorinated alkylidene groups having 1 to 6 carbon atoms; $R_3$ is selected from —CHFCH$_2$CH$_2$CH$_2$—, —CF$_2$CH$_2$CH$_2$CH$_2$—, —CF$_2$CH$_2$CH$_2$CHF—, —CF$_2$CH$_2$CH$_2$CF$_2$—, —CH$_2$CH$_2$CHFCH$_2$—, —CH$_2$CHFCHFCH$_2$—, —CH$_2$CH$_2$CH(CF$_3$)CH$_2$—, —CF$_2$CH$_2$CH$_2$CH$_2$CH$_2$—, —CF$_2$CH$_2$CH$_2$CH$_2$CF$_2$—, —CH$_2$CH$_2$CH$_2$CHFCH$_2$—, —CH$_2$CHFCH$_2$CHFCH$_2$—, —CH$_2$CHFCH$_2$CHFCHF—, —CH$_2$CH$_2$CH$_2$CH$_2$CHF—, —CH$_2$CH$_2$CH$_2$CH(CF$_3$)CH$_2$—, —CF$_2$CH$_2$CH$_2$CH$_2$CH$_2$CH$_2$—, —CH$_2$CH$_2$CH$_2$CHFCH$_2$—, —CH$_2$CHFCH$_2$CHFCH$_2$—, —CF$_2$CH$_2$CH$_2$CH$_2$CH$_2$CF$_2$—, —CH$_2$CH$_2$CH(CH$_3$)CH$_2$CHFCH$_2$—, and —CH$_2$CH$_2$CH(CF$_3$)CH$_2$CHFCH$_2$—.

3. The lithium-ion battery according to claim 2, wherein the cyclic sulfate is selected from one or more of the following compounds:

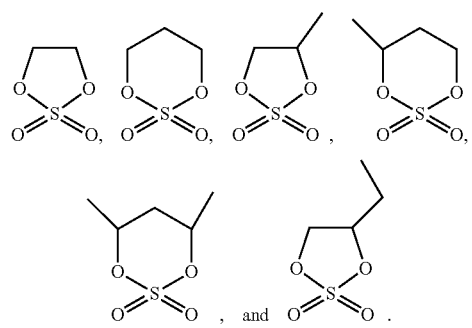

4. The lithium-ion battery according to claim 2, wherein the high oxidation potential solvent is selected from one or more of the following compounds:

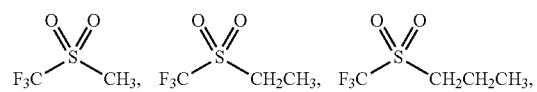

-continued

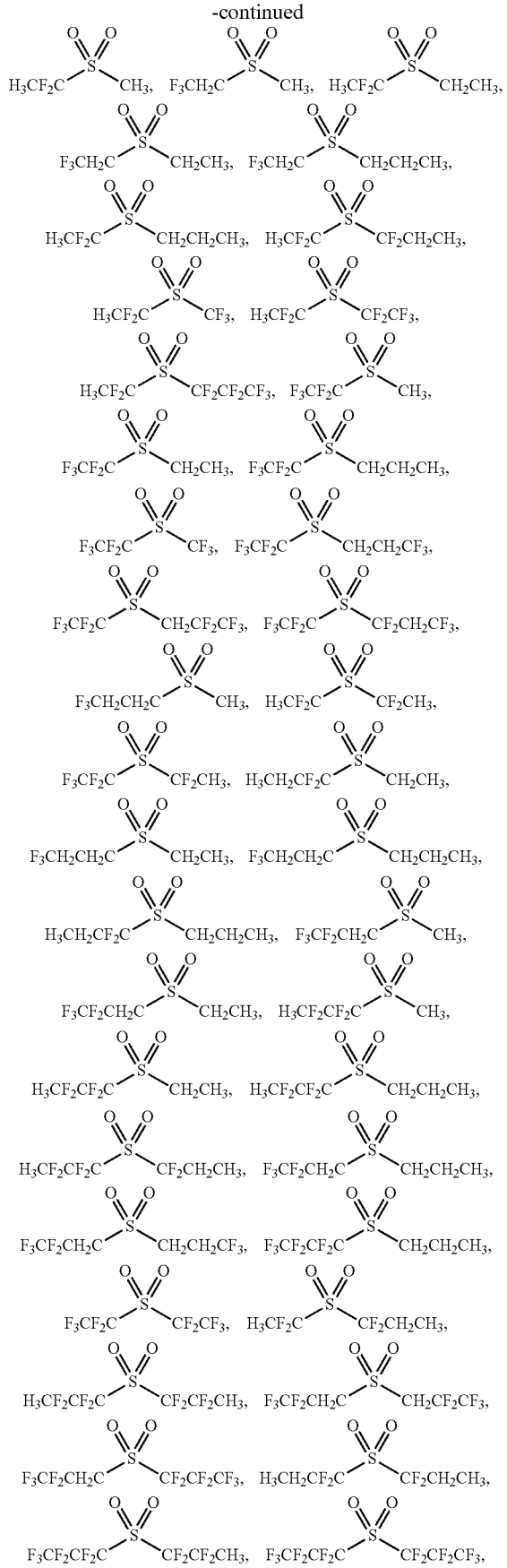

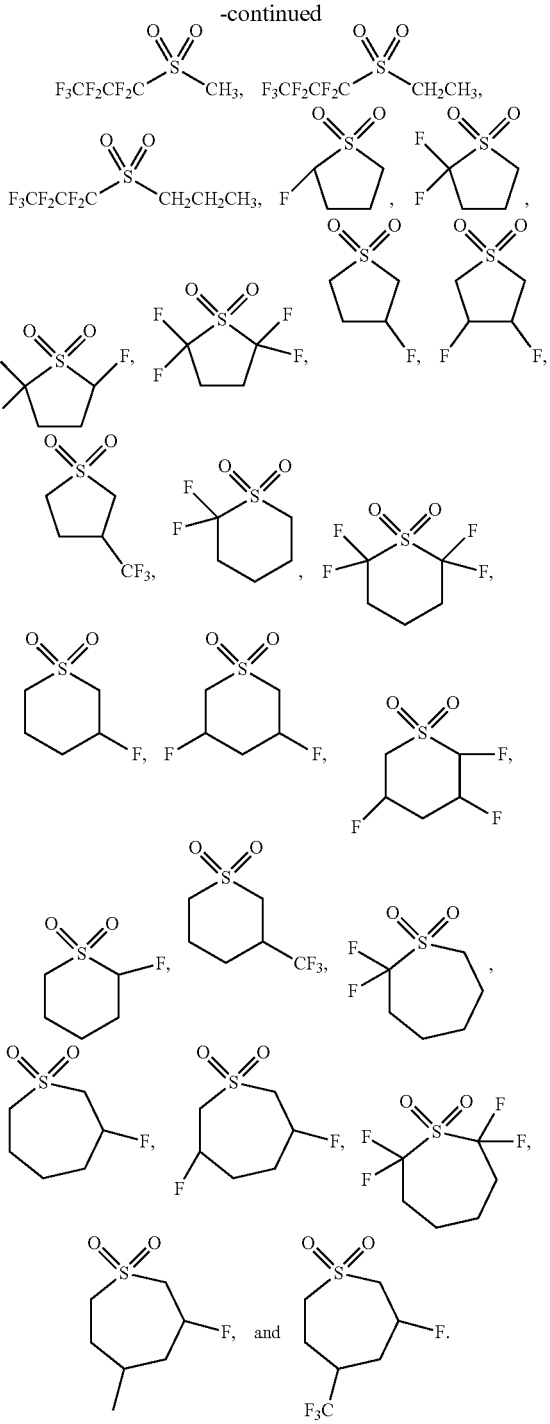

5. The lithium-ion battery according to claim 1, wherein based on a total weight of the nonaqueous electrolyte, a weight percentage of the cyclic sulfate is 0.5% to 5%.

6. The lithium-ion battery according to claim 1, wherein based on a total weight of the nonaqueous solvent,
a weight percentage of the high oxidation potential solvent is 20% to 40%; and
a weight percentage of the carbonate solvent is 60% to 80%.

7. The lithium-ion battery according to claim 1, wherein the carbonate solvent is selected from one or more of cyclic carbonate and linear carbonate; and the cyclic carbonate is selected from one or more of ethylene carbonate and propylene carbonate, and the linear carbonate is selected from one or more of ethyl methyl carbonate, methyl propyl carbonate, methyl isopropyl carbonate, methyl butyl carbonate, ethylene propyl carbonate, dimethyl carbonate, diethyl carbonate, dipropyl carbonate, and dibutyl carbonate.

8. The lithium-ion battery according to claim 7, wherein based on a total weight of the nonaqueous solvent,
a weight percentage of the cyclic carbonate is 0 to 10%; and
a weight ratio of the linear carbonate to the cyclic carbonate is 80:1 to 1:1.

9. The lithium-ion battery according to claim 1, wherein the nonaqueous electrolyte further comprises a film-forming additive; and
the film-forming additive is selected from one or more of a cyclic carbonate compound with an unsaturated bond, a halogen-substituted cyclic carbonate compound, a sulfate compound, a sultone compound, a disulfonate compound, a nitrile compound, an aromatic compound, an isocyanate compound, a phosphazene compound, a cyclic anhydride compound, a phosphite compound, a phosphate compound, a borate compound, and a carboxylate compound.

10. The lithium-ion battery according to claim 9, wherein the film-forming additive comprises at least 1,3-propane sultone.

11. A lithium-ion battery, comprising a positive electrode plate, a negative electrode plate, a separator, and the nonaqueous electrolyte according to claim 1.

12. The lithium-ion battery according to claim 11, wherein
the positive electrode plate comprises one or more of $Li_{1+x}Ni_aCo_bM'_{(1-a-b)}O_{2-c}Y_c$, and $Li_{1+y}Ni_mMn_nM''_{2-m-n}O_{4-p}Z_p$, wherein
$0.1 \leq x \leq 0.2$, $0.6 \leq a \leq 1$, $0 \leq b < 1$, $0 \leq (1-a-b) < 1$, $0 \leq c < 1$, M' is selected from one or more of Mn, Al, Mg, Zn, Ga, Ba, Fe, Cr, Sn, V, Sc, Ti, and Zr, and Y is selected from one or more of F, Cl, and Br; and
$-0.1 \leq y \leq 0.2$, $0.4 \leq m \leq 1.2$, $0.8 \leq n \leq 1.6$, $0 \leq (2-m-n) \leq 0.3$, $0 \leq p \leq 1$, M" is selected from one or more of Al, Mg, Zn, Ga, Ba, Fe, Cr, Sn, V, Sc, Ti, and Zr, and Z is selected from one or more of F, Cl, and Br.

13. An apparatus, comprising the lithium-ion battery according to claim 11, wherein the lithium-ion battery is used as a power supply for the apparatus.

14. The apparatus according to claim 13, wherein the apparatus is one selected from the group consisting of a battery electric vehicle, a hybrid electric vehicle, a plug-in hybrid electric vehicle, an electric bicycle, an electric scooter, an electric golf cart, an electric truck, an electric vessel, and an energy storage system.

* * * * *